United States Patent Office 3,005,695
Patented Oct. 24, 1961

3,005,695
4-(2-CHLORO-4-FLUORO-PHENOXY)-BUTANOIC ACID AND SALTS AND ESTERS THEREOF
Everett E. Gilbert, Morris Township, Morris County, N.J., and Christ N. Yiannios, Los Angeles, Calif., assignors to Allied Chemical Corporation, New York, N.Y., a corporation of New York
No Drawing. Filed July 16, 1958, Ser. No. 748,787
8 Claims. (Cl. 71—2.6)

This invention relates to 4-(2-chloro-4-fluorophenoxy)-butanoic acid, its salts and esters and to their use as herbicides in combatting undesired vegetation.

4-(2-chloro-4-fluorophenoxy)-butanoic acid may be represented by the following formula:

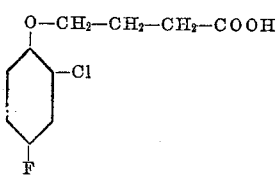

The term "salts of 4-(2-chloro-4-fluorophenoxy)-butanoic acid" is meant to include alkali metal and alkaline earth metal salts such as sodium, potassium and calcium, the ammonium salt and the substituted organic ammonium salts such as the salts of dimethylamine, trimethylamine and triethanolamine.

The term "esters of 4-(2-chloro-4-fluorophenoxy)-butanoic acid" is meant to include esters formed from saturated and unsaturated monohydric or polyhydric alcohols. Typical of such alcohols are butanol, octanol and butoxyethoxyethanol. In our copending application Serial No. 748,829, filed of even date herewith, we disclose and claim esters of 4-(2-chloro-4-fluorophenoxy)-butanol-1. The present invention and the appended claims are not intended to include esters of that compound and 4-(2-chloro-4-fluorophenoxy)-butanoic acid.

4-(2-chloro-4-fluorophenoxy)-butanoic acid may be prepared by reacting sodium 2-chloro-4-fluorophenate with butyrolactone to form sodium 4-(2-chloro-4-fluorophenoxy)-butanoic acid, which is then acidified to the free acid, as illustrated by the following equations:

(1)
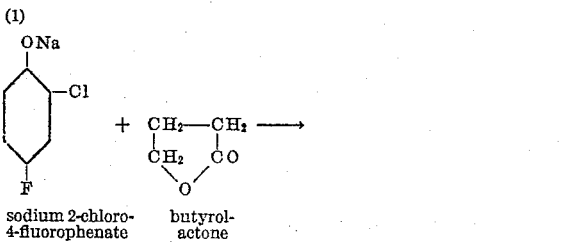
sodium 2-chloro-4-fluorophenate    butyrolactone

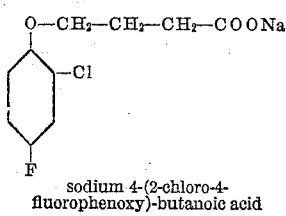
sodium 4-(2-chloro-4-fluorophenoxy)-butanoic acid (2)
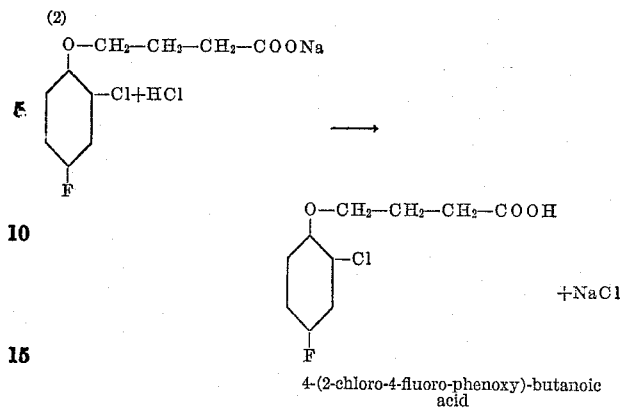
4-(2-chloro-4-fluoro-phenoxy)-butanoic acid The salts and esters of 4-(2-chloro-4-fluorophenoxy)-butanoic acid may be prepared by standard procedures well known in the art, comprising (in the case of the salts) direct neutralization of the acid with the appropriate base, or (in the formation of esters) reaction of the acid with the appropriate alcohol in the presence of an acid catalyst.

The following examples, in which parts are by weight, are illustrative of the novel compounds of this invention and their preparation:

*Example 1.*—105 parts of 2-chloro-4-fluorophenol were added to a solution of 16.5 parts of sodium metal in about 157.8 parts of absolute ethanol, maintained in a reaction vessel provided with a reflux condenser and a stirrer. After stirring for a brief period, 61.7 parts of butyrolactone were added, and the mixture was refluxed at about 80° C. for 24 hours. The ethanol was then distilled out of the reaction mixture by heating the mixture to about 100° C. The residue was dissolved in water and acidified with hydrochloric acid, thereby precipitating a brown amorphous, crystalline solid. The crystalline solid was dissolved in benzene, treated with activated carbon and finally precipitated with petroleum ether as white crystals. After filtering off the white crystals and drying them at about 40° C., 57 parts (34% of theory) of 4-(2-chloro-4-fluorophenoxy)-butanoic acid were obtained. This compound was sparingly soluble in water and organic hydrocarbon solvents, melted at 92–95° C. and had a neutral equivalent of 229.5.

*Example 2.*—5.9 parts of anhydrous dimethylamine were added gradually over about a 5 minute period with stirring to 20 parts of 4-(2-chloro-4-fluorophenoxy)-butanoic acid, prepared as in Example 1. The acid gradually dissolved to produce the water-soluble dimethylamine salt of 4-(2-chloro-4-fluorophenoxy)-butanoic acid in high yield.

*Example 3.*—74 parts of 4-(2-chloro-4-fluorophenoxy)-butanoic acid, prepared as in Example 1, are placed in a reaction vessel provided with a reflux condenser and a Dean-Stark trap for collection of separated water. 125.5 parts of ethylene dichloride, 1.1 parts of concentrated sulfuric acid and 37 parts of n-butanol are added to the reaction flask, and the reaction mixture is refluxed for 4 hours, water of reaction being collected by the Dean-Stark trap. The reaction mixture is cooled, dissolved in ether, washed successively with water, aqueous sodium bicarbonate and water and finally distilled to remove ether solvent. Vacuum distillation produces the n-butyl ester of 4-(2-chloro-4-fluorophenoxy)-butanoic acid in high yield.

As indicated above, 4-(2-chloro-4-fluorophenoxy)-butanoic acid, its salts and esters are useful as herbicides in combatting undesired vegetation. Not only do these compounds control the broad leaf or dicotyledonous varieties of plants such as smartweed, rape, lamb's-quarters, bindweed, horse nettle and Canada thistle, which commonly grow wild in agricultural and other soils, but also the more pernicious monocotyledonous plants or grasses such as rye grass, foxtail, crab grass and nut grass, which also commonly appear in such soils.

4-(2-chloro-4-fluorophenoxy)-butanoic acid, its salts and esters may be applied directly to the vegetation to be treated. However, for reasons of economy and to achieve greater uniformity of application, it is preferred to incorporate the active ingredient in liquid or solid diluents. Outstanding results may be attained by employing as the diluent liquids in which the herbicide is soluble or dispersible.

The liquid diluent may be a solvent for the active ingredient or the active ingredient may be dispersed in the liquid diluent. Since the free acid is sparingly soluble in water and organic hydrocarbon solvents, it may be conveniently formulated as a water-dispersible powder. The salts are soluble in water and may be formulated as concentrated or dilute solutions in water. The esters, being insoluble in water but soluble in organic hydrocarbon solvents, may be formulated as emulsifiable concentrates and dilute solutions in the organic hydrocarbon solvents. Typical organic hydrocarbon solvents include fuel oils, petroleum naphthas, etc. The solutions or dispersions should contain the active ingredient (expressed as the free acid) in an amount not less than ½ of a pound per 100 gallons of dispersion or solution, the more usual concentrations being in the range of 1 to 2 pounds per 100 gallons of dispersion or solution.

As indicated above, the active ingredient may be impregnated on a suitable solid diluent. Typical diluents, which may be in finely divided or granular form, include diatomaceous earth, wood flours and silica gels. The dusts may contain as little as about 0.5% by weight of active ingredient (expressed as the free acid).

Various conventional wetting, dispersing and emulsifying agents may be added to the herbicidal formulations of the type described in order to enhance the wetting effect and produce improved dispersion of the active ingredient on the vegetation to which it is applied.

Any of the known types of spraying or dusting apparatus may be employed for applying the herbicide to the vegetation to be treated, a primary consideration being uniformity of application.

The herbicides of the present invention are applied to the area to be treated in amount (pounds per acre) sufficient to afford the degree of control of vegetation desired in the given area. The optimum intensity of application of the desired herbicide will depend on such factors as amount of vegetation in the area, degree of permanency of plant eradication desired, type of plants growing in the area, and climatic conditions. Hence, as is well known to those skilled in the art, the rate of application actually used will depend largely on prevailing local conditions. In most instances, effective control of germinating weed seeds and small weed seedlings may be realized by applying the herbicide at an over-all rate greater than about 1 pound per acre. Where prolonged non-selective control of established vegetation is desired, dosages greater than about 4 pounds per acre are employed.

The following example is illustrative of the herbicidal activity of the compounds of the present invention.

A test plot was covered with monocotyledonous and dicotyledonous plants, as well as crop plants, of established growth. These plants included:

| Monocotyledonous Plants | Dicotyledonous Plants | Crops |
|---|---|---|
| rye grass. foxtail. crab grass. nut grass. | smart weed. rape. lamb's-quarters. bind weed. horse nettle. Canada thistle. | alfalfa. lespedeza. barley. wheat. oats. buckwheat. soybeans. snap beans. lima beans. squash. cotton. field corn. sweet corn. |

A formulation comprising 1 part of the dimethylamine salt of 4-(2-chloro-4-fluorophenoxy)-butanoic acid to 5 parts of water was applied to the test plot at the rate of one pound (100% active ingredient expressed as the free acid) per acre. A formulation comprising 2 pounds of the dimethylamine salt of 4-(2,4-dichlorophenoxy)-butanoic acid, a commercial product known as "ACP M-118," per gallon of water solution, was applied to a similar test plot at the rate of one pound (100% active ingredient expressed as the free acid) per acre. The following comparative data were obtained.

| | Dicotyledonous Plants | Monocotyledonous Plants |
|---|---|---|
| | Percent Plants Killed or Absent Compared to Untreated Check Plots | |
| dimethylamine salt of 4-(2-chloro-4-fluorophenoxy) butanoic acid | 90 | 50 |
| "ACP M-118" (dimethylamine salt of 4-(2,4-dichlorophenoxy)-butanoic acid) | 90 | 0 |

These results demonstrate that the dimethylamine salt of 4-(2-chloro-4-fluorophenoxy)-butanoic acid, a compound typical of those embraced by the present invention, is active on both dicotyledonous and monocotyledonous plants, whereas its chloro-analog, a commercial herbicide, is completely inactive on monocotyledonous plants at the same dosage.

In addition, the dimethylamine salt of 4-(2-chloro-4-fluorophenoxy)-butanoic acid gave little or no injury to barley, field corn and sweet corn and also no excessive injury to oats. The present compounds, therefore, may be advantageously employed as selective herbicides.

Since various changes and modifications may be made without departing from the spirit thereof, the invention is to be taken as limited only by the scope of the appended claims.

We claim:

1. A compound selected from the group consisting of 4-(2-chloro-4-fluorophenoxy)-butanoic acid, a salt selected from the group consisting of the alkali metal, alkaline earth metal, amonium, lower alkylamine and hydroxy lower alkylamine salts of 4-(2-chloro-4-fluorophenoxy)-butanoic acid and an ester selected from the group consisting of the lower alkyl and lower alkoxy lower alkyl esters of 4-(2-chloro-4-fluorophenoxy)-butanoic acid.

2. 4-(2-chloro-4-fluorophenoxy)-butanoic acid.

3. A salt selected from the group consisting of the alkali metal, alkaline earth metal, ammonium, lower alkylamine and hydroxy lower alkylamine salts of 4-(2-chloro-4-fluorophenoxy)-butanoic acid.

4. An ester selected from the group consisting of the lower alkyl and lower alkoxy lower alkly esters of 4-(2-chloro-4-fluorophenoxy)-butanoic acid.

5. A herbicidal composition consisting essentially of a compound selected from the group consisting of 4-(2- chloro-4-fluorophenoxy)-butanoic acid, a salt selected from the group consisting of the alkali metal, alkaline earth metal, ammonium, lower alkylamine and hydroxy lower alkylamine salts of 4-(2-chloro-4-fluorophenoxy)-butanoic acid and an ester selected from the group consisting of the lower alkyl and lower alkoxy lower alkyl esters of 4-(2-chloro-4-fluorophenoxy)-butanoic acid as active ingredient, and a liquid diluent therefor, said compound being present in amount, as the free acid, of at least ½ of a pound per 100 gallons of the composition.

6. A herbicidal composition consisting essentially of a compound selected from the group consisting of 4-(2-chloro-4-fluorophenoxy)-butanoic acid, a salt selected from the group consisting of the alkali metal, alkaline earth metal, ammonium, lower alkylamine and hydroxy lower alkylamine salts of 4-(2-chloro-4-fluorophenoxy)-butanoic acid and an ester selected from the group consisting of the lower alkyl and lower alkoxy lower alkyl esters of 4-(2-chloro-4-fluorophenoxy)-butanoic acid as active ingredient, and a solid diluent therefor, said compound being present in amount, as the free acid, of at least about 0.5% by weight of the composition.

7. The method of combatting growth of monocotyledonous and dicotyledonous plants which comprises treating said plants with a compound selected from the group consisting of 4-(2-chloro-4-fluorophenoxy)-butanoic acid, a salt selected from the group consisting of the alkali metal, alkaline earth metal, ammonium, lower alkylamine and hydroxy lower alkylamine salts of 4-(2-chloro-4-fluorophenoxy)-butanoic acid and an ester selected from the group consisting of the lower alkyl and lower alkoxy lower alkyl esters of 4-(2-chloro-4-fluorophenoxy)-butanoic acid, in amount sufficient to cause deterioration of said plants.

8. The method of combatting growth of monocotyledonous and dicotyledonous plants which comprises applying to said plants a herbicidal composition comprising a compound selected from the group consisting of 4-(2-chloro-4-fluorophenoxy)-butanoic acid, a salt selected from the group consisting of the alkali metal, alkaline earth metal, ammonium, lower alkylamine and hydroxy lower alkylamine salts of 4-(2-chloro-4-fluorophenoxy)-butanoic acid and an ester selected from the group consisting of the lower alkyl and lower alkoxy lower alkyl esters of 4-(2-chloro-4-fluorophenoxy)-butanoic acid, and a diluent therefor, the amount of said compound so applied being sufficient to cause deterioration of said plants.

References Cited in the file of this patent

UNITED STATES PATENTS

| | | |
|---|---|---|
| 2,396,513 | Jones | Mar. 12, 1946 |

FOREIGN PATENTS

| | | |
|---|---|---|
| 793,514 | Great Britain | Apr. 16, 1958 |
| 793,740 | Great Britain | Apr. 23, 1958 |

OTHER REFERENCES

Newman et al.: J. Am. Chem. Soc. 69, 719, 720 (1947).
Weintraub et al.: J. Agr. Food Chem. 2, 996–9 (1954).